UNITED STATES PATENT OFFICE.

GEORGE S. A. CASSIMUS, OF ST. LOUIS, MISSOURI.

VARNISH REVIVING AND POLISHING COMPOSITION.

1,161,187.      Specification of Letters Patent.      Patented Nov. 23, 1915.

No Drawing.      Application filed September 28, 1914. Serial No. 863,830.

*To all whom it may concern:*

Be it known that I, GEORGE S. A. CASSIMUS, a citizen of the United States, residing at St. Louis, Missouri, have invented a certain new and useful Improvement in Varnish Reviving and Polishing Compositions, of which the following is a full, clear, and exact description, such as will enable others skilled in the art to which it appertains to make and use the same.

This invention relates to compositions for reviving varnished surfaces, and has for its main object to provide a composition that will not only revive a varnished surface, but also thoroughly clean the surface and deposit on same an insoluble oxid which is capable of taking a high polish or gloss.

Another object is to provide a composition of the character described that has no deleterious effect on varnished surfaces, and which will render the surface on which it is applied practically impervious to moisture, thereby preventing the varnish on the surface from being affected by dampness or atmospheric conditions.

Other objects and desirable features of my invention will be hereinafter described.

Briefly described, my composition consists of water, soap, magnesium-oxid, silica and linseed oil. The exact proportions of the various ingredients in the composition may be varied within certain limits without departing from the spirit of my invention, but I have found that a composition composed of approximately 6 parts of soap, 3 parts of magnesium-oxid, 48 parts of silica, 44 parts of linseed oil and 120 parts of water produces a substance that will thoroughly remove all the dirt and grit from a varnished surface, revive or renew the varnish and deposit over the varnish a thin coating of insoluble oxid that will take on a high polish or gloss when rubbed briskly. Any good grade of soap may be used, preferably castile or Ivory soap. The magnesium-oxid that I prefer to use is calcined magnesia or chemically pure magnesia, and I also prefer to use silica from which all of the grit has been removed, so that it is in the form of an impalpable powder. The best results are obtained by using distilled water, and I also prefer to use boiled linseed oil which is heated prior to combining it with the other ingredients.

It is immaterial, so far as my invention is concerned, how the various ingredients are combined, so long as they are thoroughly mixed together, but I prefer to combine the soap, the magnesium-oxid and the silica when they are in a liquid or semi-liquid state.

The silica and soap from which the injurious alkalis have been removed act to remove the dirt, grease and other foreign particles from the surface to which the composition is applied, and the linseed oil combines with the potash in the soap and with the magnesium-oxid to form an insoluble oxid which fills up the pores of the varnish and revives the same, presumably due to the action of the oxid on the resin in the varnish. This thin coating of insoluble oxid that is deposited on the varnish not only restores the original luster and gloss of the varnish when it is polished briskly, but it also protects the varnish from dampness and prevents water from penetrating same. In fact, water does not discolor or have practically any effect on a varnished surface that has been treated with my composition, thus showing that the thin coating that is deposited on the varnish is impervious to water.

In using the composition the best results are obtained by saturating a piece of cheesecloth or other suitable material with the composition and rubbing it over the surface to be treated, so as to clean and polish the surface. The surplus solution is then wiped off and thereafter the surface is polished briskly with a piece of dry cheesecloth or other suitable material until a high polish or gloss is obtained.

While my improved composition is capable of general use on all kinds of varnished surfaces, it is particularly adapted for use on automobiles and other varnished objects that are exposed to the weather, owing to the fact that it renders the varnish water-proof and prevents it from becoming dull or spotted when it is washed frequently, or when rain is allowed to stand on same.

Having thus described my invention, what I claim and desire to secure by Letters Patent is:

1. A composition for treating varnished surfaces consisting of water, soap, magnesium-oxid, silica and linseed oil mixed in substantially the proportions described.

2. A composition for treating varnished surfaces consisting of water, calcined magnesia, silica from which the grit has been removed, boiled linseed oil and potash soap mixed in approximately the proportions described.

3. A composition for treating varnished surfaces comprising approximately 6 parts of soap, 3 parts of magnesium-oxid, 48 parts of silica, 44 parts of linseed oil and 120 parts of water all thoroughly mixed together.

4. A composition for treating varnished surfaces formed from water, comparatively small quantities of soap and calcined magnesia and sufficient boiled linseed oil and commercial silica to combine with the soap and magnesium oxid to form an insoluble coating on the surface to which the composition is applied.

In testimony whereof I hereunto affix my signature in the presence of two witnesses, this twenty sixth day of September 1914.

GEORGE S. A. CASSIMUS.

Witnesses:
LENORE WILSON,
GEORGE BAKEWELL.